US008868545B2

(12) United States Patent
Xu et al.

(10) Patent No.: US 8,868,545 B2
(45) Date of Patent: Oct. 21, 2014

(54) TECHNIQUES FOR OPTIMIZING OUTER JOINS (75) Inventors: Yu Xu, Burlingame, CA (US); Ahmad Said Ghazal, Redondo Beach, CA (US)

(73) Assignee: Teradata US, Inc., Dayton, OH (US)

( * ) Notice: Subject to any disclaimer, the term of this patent is extended or adjusted under 35 U.S.C. 154(b) by 278 days.

(21) Appl. No.: 13/340,300

(22) Filed: Dec. 29, 2011

(65) Prior Publication Data

US 2013/0173589 A1 Jul. 4, 2013

(51) Int. Cl.
*G06F 17/30* (2006.01)

(52) U.S. Cl.
USPC ........... 707/713; 707/714; 707/716; 707/759; 707/765

(58) Field of Classification Search
USPC ..................... 707/713, 714, 716, 759, 765
See application file for complete search history.

(56) References Cited

U.S. PATENT DOCUMENTS

| | | | | |
|---|---|---|---|---|
| 5,121,494 | A * | 6/1992 | Dias et al. ........................ | 1/1 |
| 5,713,015 | A | 1/1998 | Goel et al. | |
| 5,724,568 | A | 3/1998 | Bhargava et al. | |
| 5,832,477 | A | 11/1998 | Bhargava et al. | |
| 5,864,842 | A * | 1/1999 | Pederson et al. ............... | 1/1 |
| 5,864,847 | A | 1/1999 | Goel et al. | |
| 5,875,447 | A | 2/1999 | Goel et al. | |
| 5,963,933 | A | 10/1999 | Cheng et al. | |
| 6,298,342 | B1 * | 10/2001 | Graefe et al. ................. | 707/602 |
| 6,341,281 | B1 * | 1/2002 | MacNicol et al. ................ | 1/1 |
| 6,438,541 | B1 | 8/2002 | Witkowski | |
| 6,449,606 | B1 * | 9/2002 | Witkowski ...................... | 1/1 |
| 6,477,525 | B1 * | 11/2002 | Bello et al. ..................... | 1/1 |
| 7,188,098 | B2 * | 3/2007 | Chen et al. ..................... | 1/1 |
| 7,440,937 | B2 * | 10/2008 | Kiernan et al. ................. | 1/1 |
| 7,546,311 | B2 | 6/2009 | Nica | |
| 7,730,055 | B2 | 6/2010 | Bellamkonda et al. | |
| 2004/0006561 | A1 * | 1/2004 | Nica .................................. | 707/3 |
| 2004/0220923 | A1 * | 11/2004 | Nica .................................. | 707/3 |
| 2006/0129572 | A1 * | 6/2006 | Cole et al. ..................... | 707/100 |
| 2006/0167865 | A1 * | 7/2006 | Andrei ............................. | 707/4 |
| 2006/0287979 | A1 * | 12/2006 | Beavin et al. ..................... | 707/2 |
| 2008/0071785 | A1 * | 3/2008 | Kabra et al. ...................... | 707/9 |
| 2008/0140696 | A1 * | 6/2008 | Mathuria ...................... | 707/102 |
| 2008/0215534 | A1 * | 9/2008 | Beavin et al. ..................... | 707/2 |
| 2009/0024568 | A1 * | 1/2009 | Al-Omari et al. ................. | 707/2 |
| 2009/0063527 | A1 * | 3/2009 | Corvinelli et al. ............ | 707/101 |
| 2009/0119247 | A1 * | 5/2009 | Bellamkonda et al. .......... | 707/2 |
| 2009/0248617 | A1 * | 10/2009 | Molini ............................. | 707/2 |
| 2012/0047158 | A1 * | 2/2012 | Lee et al. ..................... | 707/759 |

* cited by examiner

*Primary Examiner* — Hanh Thai (74) *Attorney, Agent, or Firm* — Schwegman, Lundberg & Woessner, P.A.

(57) ABSTRACT

Techniques for optimizing outer joins in database operations are provided. In an embodiment, a query having an outer join with a GROUP BY clause is rewritten and expanded to expand a first level partition of that GROUP BY clause to produce a modified query. In another situation, rows associated with processing a query are each row split and then hashed based at least in part on attributes of the outer join predicate. A left outer join is performed and a global aggregation processed to produce a spooled table to process the query.

20 Claims, 5 Drawing Sheets

TECHNIQUES FOR OPTIMIZING OUTER JOINS

BACKGROUND

A database join operation combines records from more than one database table. A join essentially creates a set that can be saved as its own independent database tables. There are a variety of types of joins.

One type of join is called an outer join. An outer join does not require each record in the two joined tables to have a corresponding matching record. The resulting joined table retains each record, even if no other matching record exists. Outer joins may be subdivide further into left outer joins, right outer joins, and full outer joins, depending on which table(s) the rows are retained from, such as left, right, or both. A left outer join retains all records from the left table regardless of matching and retains only matching records from a right table. Conversely, a right outer join retains all records from a right table regardless of matching and retains only matching records from the left table. A full outer join includes records from both the left and right tables regardless of matching.

Another type of join is the inner join. An inner join creates a common results table from two tables by combining common values from the two tables via a join predicate.

Structured Query Language (SQL) also includes a variety of other clauses and operations that can be used in connection with join operations. For example, a GROUP BY clause is used to project rows having common values into a smaller set of rows. GROUP BY is often used in conjunction with Structured Query Language (SQL) aggregation functions or to eliminate duplicate rows from a result set.

A variation on the GROUP BY is a Partial GROUP BY (PGB), which is a technique that applies group-by/aggregation operations early on to reduce row redistribution cost and also to reduce the input sizes to join operations. PGB can significantly improve query performance.

Large scale databases include query optimizers that determine a most efficient way to execute a query by considering multiple different query plans and the cost of each individual query plan. However, currently optimizers have a restriction, such that a PGB is only eligible on an inner table of an outer join operation. Thus, PGB cannot be applied on the outer table in an outer join because otherwise the un-matching rows of the outer table would be lost after the early-aggregation.

SUMMARY

In various embodiments, techniques for optimizing outer joins are presented. According to an embodiment, a method for optimizing an outer join is provided.

Specifically, an outer join on a join table and a second table is detected in a query, the query also including a GROUP BY clause. The GROUP BY clause is expanded to double a total number of groups in a first level partition of the GROUP BY clause for the second table by generating additional query statements in an expanded query that when executed produce a first list of first attributes that satisfy an ON clause predicate for the second table on an ON clause and a second list of attributes that satisfy a join predicate on the ON clause for the second table. Finally, a modified query is produced having the expanded GROUP BY clause, the modified query is equivalent to the query.

DETAILED DESCRIPTION

Initially for purposes of illustration and comprehension and before the FIGS. are discussed, some context and examples are presented to highlight the techniques being presented herein and below.

Essentially, two new and novel techniques are presented for purposes of applying a Partial GROUP BY (PGB) to outer tables in outer joins. It is also noted that whether a query optimizer is to apply one of the techniques to the exclusion of the other technique for any particular outer join is a query optimizer cost based decision.

Now a variety of examples and aspects of the techniques are presented for purposes of comprehension and describing various embodiments and scenarios for the invention.

Consider the following example left outer join query:
SELECT $G(R)$, $G(S)$, aggregate_function( . . . )
FROM R left outer join S
ON $o(R)$ and $o(S)$ and J
WHERE $w(R)$ and $w(S)$
GROUP BY $G(R),G(S)$ Where:

$G(R)$ is the list of grouping attributes from R in the SELECT/GROUP-BY clause, $G(S)$ is the list of grouping attributes from S in the SELECT/GROUP-BY clause, $o(R)$ is the list of predicates on attributes only from R in the ON clause, $o(S)$ is the list of predicates on attributes only from S in the ON clause, $w(R)$ is the list of predicates on attributes from only R in the WHERE clause, $w(S)$ is the list of predicates only on attributes only from S in the WHERE clause, and J is the list of predicates each of which involves attributes from both R and S in the ON clause. Only equality conditions are considered in J.

Case 1:

When $w(S)$ is present in the WHERE clause, it effectively turns the outer join to an inner join (assuming $w(S)$ is a null filtering condition).

Case 2:

When $w(R)$ is present in the WHERE clause, it can be pushed down to the relation R, that is, we can first apply the predicate $w(R)$ to R and then left outer join the result with S.

Case 3:

When $o(S)$ is present in the ON clause, it can be pushed down to the relation S, that is, we can first apply the predicate $o(S)$ to S and then left outer join R and the result.

Case 4:

When $o(R)$ is present in the ON clause, $o(R)$ is applied in the left outer joining stage.

For purposes of the discussion that follows, case 4 is resolved to rewrite optimization rules for a query optimize to improve operational efficiency. The first 3 cases are easier to address and have existing query optimizer resolutions; thus, the focus herein is on solving the more difficult case 4. In this manner, consider the following example for a case 4 scenario:

SELECT G(R), G(S), agg-fun(R)
    FROM R left outer join S
    On o(R) and J
    GROUP BY G(R), G(S)

Notice that the attributes of R and S in the SELECT clause do not have to be exactly G(R) and G(S). G(R) and G(S) are each assumed to be fields for simplicity and illustration only, since it is noted that these can be expressions as well. Moreover, there can be expressions that reference both R and S. Again, the techniques work equally as well in these scenarios as well.

An essential issue as to why current query optimizer cannot apply PGB optimization to the above sample query is that rows of R, which have the same join attribute values and have the same grouping-list values, can be aggregated; however, this is wrong in general since some rows may satisfy o(R) while some may not satisfy o(R). Thus, the approach that tries to apply aggregates early on to the rows of R, creates a situation where the opportunity is lost in the later join phase to know which rows satisfy o(R) and which rows do not satisfy o(R).

Consequently, the following two new and novel approaches are presented.

First Technique

A new query rewriting technique is provided to rewrite the above query (case 4 and previous example) to the following equivalent query, which allows a query optimizer to consider the PGB situation on an outer join. Firstly, a (partial) GROUP BY operation is performed on the R table. The GROUP BY list includes a case expression, which returns 1 when a row satisfies o(R) and returns 0 otherwise.

```
SELECT G(R₁), G(S), agg-fun(R₁)
FROM
    ( select G(R), attr(J(R)),
         (case when (o(R) then 1 else 0 end) as CEXP,
         agg-fun(R)
      From R
      Group by G(R), attr(J(R)), CEXP
    ) R₁
left outer join S
ON (CEXP=1) and J
    GROUP BY G(R₁), G(S)
```

In the above query, attr(J(R)) is the list of attributes of R in the join predicates.

Query Rewriting for First Technique:

The restatement and rewriting of the query essentially doubles the number of groups in the first level partial grouping operation in a worst case scenario, which occurs when every group has rows that satisfy o(R) and others that do not satisfy o(R). A run-time optimization is that when CEXP only produces one value, the (CEXP=1) expression in the ON clause can be dropped.

A special optimization is that the CEXP expression does not have to be included in the grouping-list of the inner partial GROUP BY query when the list of R attributes in o(R) is a subset of (or the same as) the list of attributes of R in the original group-by list. Thus, the rewritten query is as follows:

```
SELECT G(R₁), G(S), agg-fun(R₁)
FROM
    ( select G(R), attr(J(R)),
         agg-fun(R)
```

-continued

```
      From R
      Group by G(R), attr(J(R))
    ) R₁
left outer join S
ON o(R₁) and J
    GROUP BY G(R₁), G(S)
```

This is because in this special case, the grouping in the inner query will automatically put two rows of R into two different groups when one row satisfies o(R) while the other does not satisfy o(R), since the grouping list includes all attributes in o(R).

One key advantage of the query rewriting technique is that it is easy to implement and requires minimal changes to the system. The query is restated using the methodology proven above and a minimal modification to the query optimizer is made to now compute the cost associated with executing the newly stated query. No new Access Module Processor (AMP) steps or AMP step changes are required with this approach.

Second Technique

The following describes a new technique similar to the above query rewriting but is some aspects more efficient. The technique implements more changes to existing query optimizers by way of novel enhancements. In addition to Optimizer changes, AMP-step changes are also made.

Figure 1:
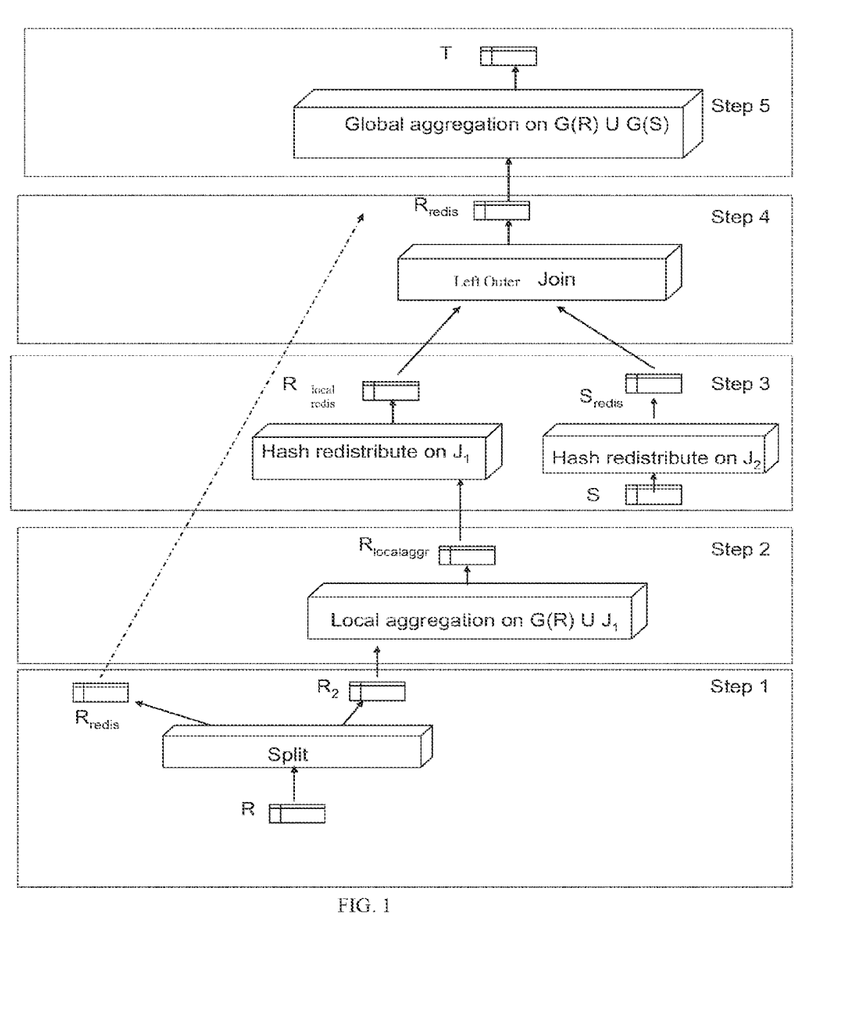
FIG. 1 is a flow diagram for optimizing an outer join, according to an example embodiment.

By way of illustration, assume the size of R and S requires redistributing both relations, and that the join condition J is not on the primary index columns of R and S. The steps in the approach are explained below. A visual description of the processing is shown in FIG. 1. Notice that the new technique is applicable too when the above assumptions are not true.

Step 1

Execute the following steps in parallel.

Scan R and put rows of R into two spools $R_{redis}$ and $R_2$ where $R_{redis}$ contains rows that do not satisfy o(R) and $R_2$ contains rows satisfying o(R).

Step 2

$R_2$ is locally aggregated on attributes G(R) U $J_1$ (attributes of R in J) and the results are stored in $R_{localaggr}$.

Step 3

1) S is hash redistributed on $J_2$ (attributes of S in J) into $S_{redis}$.

2) $R_{localaggr}$ is hash redistributed on $J_1$ (attributes of R in J) into $R_{localredis}$.

Step 4

$S_{redis}$ and $R_{localredis}$ are left outer joined and the results are added to $R_{redis}$ which is created in Step 2.

Step 5

The current global aggregation algorithm is applied to $R_{redis}$ on G(R) U G(S) and the final results are stored in the spool T.

Figure 2:
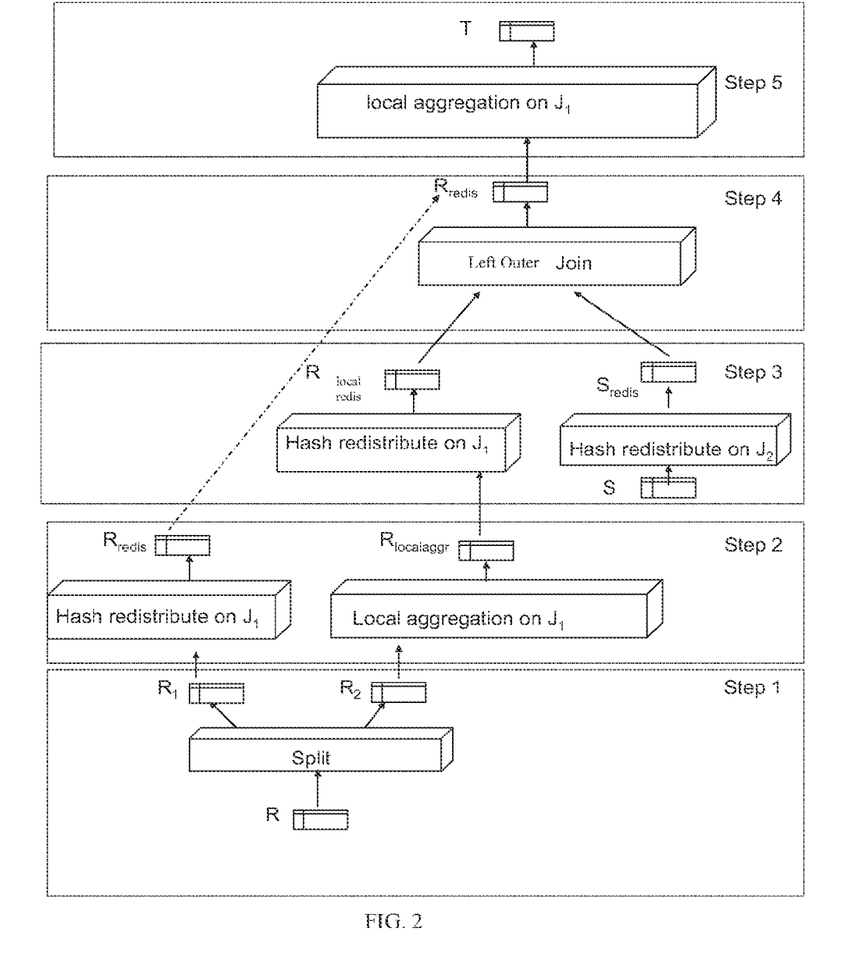
FIG. 2 is a flow diagram for optimizing an outer join when considering a grouping list, according to an example embodiment.

FIG. 1 is a flow diagram for optimizing an outer join, according to an example embodiment. Further, FIG. 2 is a flow diagram for optimizing an outer join when considering a grouping list, according to an example embodiment. FIG. 1 primarily differs from FIG. 2 in the manner in which steps 1, 2, and 5 are handled. Thus, FIGS. 1 and 2 are discussed together. Moreover, it is to be noted that the components of the FIGS. 1 and 2 are implemented and reside in a non-transitory computer-readable medium and execute on one or more processors that are specifically configured to execute the components. The FIGS. 1 and 2 are variations of the second technique.

Algorithms for the Second Technique

Depending on whether the aggregate function in the SELECT is count/avg/sum, some additional bookkeeping information is carried over from Step 2 to Step 3.

The proposed techniques can be applied to right outer joins. Right outer joins can be rewritten to equivalent left outer joins and thus can be processed as discussed.

A special optimization is described below when $J_1=G(R) \cup G(S)$, which means that the grouping list in the original query does not have any attribute from S and is the same as the list of attributes of R in the join predicates. The new steps are described below. Only Steps 1, 2 and 5 are slightly different than the steps described in FIG. 1.

Step 1

Execute the following steps in parallel.

Scan R and put rows of R into two spools $R_1$ and $R_2$ where $R_1$ contains rows that do not satisfy o(R) and $R_2$ contains rows satisfying o(R).

Step 2

1) $R_1$ is hash redistributed to $R_{redis}$ according to attributes $(J_1)$

2) $R_2$ is locally aggregated on attributes $G(R) \cup J_1$ and the results are stored in $R_{localaggr}$.

Step 3

1) S is hash redistributed on $J_2$ (attributes of S in J) into $S_{redis}$.

2) $R_{localaggr}$ is hash redistributed on $J_1$ (attributes of R in J) into $R_{localredis}$.

Step 4

$S_{redis}$ and $R_{localredis}$ are left outer joined and the results are stored in $R_{redis}$ which is created in Step 2.

Step 5

Apply local aggregation to $R_{redis}$ on $J_1$ and the final results are stored in the spool T.

Notice the redistribution in Step 2 on $R_1$ in order to be able to perform local aggregation in Step 5.

Figure 3:
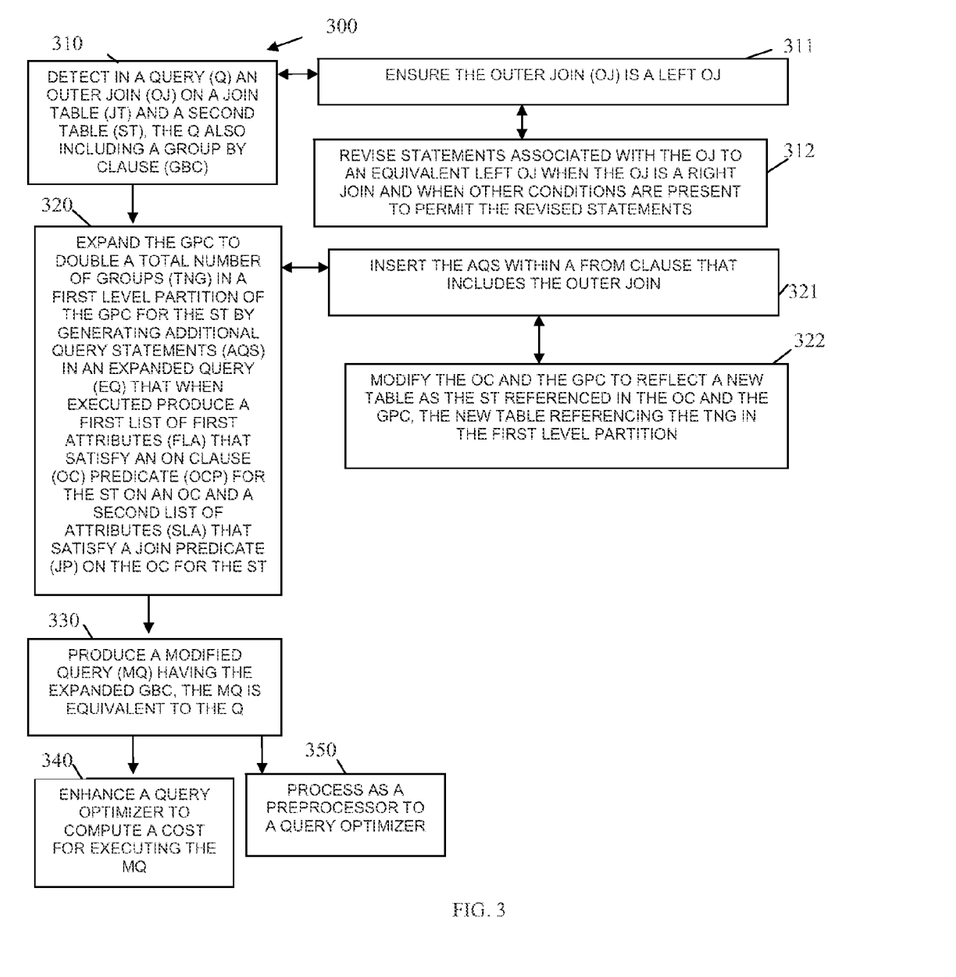
FIG. 3 is a diagram of a method for optimizing an outer join, according to an example embodiment.

FIG. 3 is a diagram of a method 300 for optimizing an outer join, according to an example embodiment. The method 300 (hereinafter "query rewriter") is implemented as instructions within a non-transitory computer-readable storage medium that execute on one or more processors, the processors specifically configured to execute the query rewriter. Moreover, the query rewriter is programmed within a non-transitory computer-readable storage medium. The query rewriter may also be operational over a network; the network is wired, wireless, or a combination of wired and wireless.

The query rewriter presents another and in some ways an enhanced processing perspective to that which was discussed and shown above with respect to the first technique.

At 310, the query rewriter detects (given or passed) a query having an outer join on a join table and a second table. The query also includes a GROUP BY clause. Case number 4 discussed above.

According to an embodiment, at 311, the query rewriter ensures the outer join is a left outer join. This can be done in a variety of ways.

For example, at 312, the query rewriter revise statements associated with the outer join to an equivalent left outer join when the outer join is a right join and when other conditions are present that permit the revised statements to be made.

At 320, query rewriter expands the GROUP BY clause to double a total number of groups in a first partition of the GROUP BY clause for the second table. A detailed explanation and reduction of this rewriting to a reduced form was presented above with the discussion of the first technique. Specifically, this is done by generating additional query statements in an expanded query that when executed produces a first list of attributes that satisfy an ON clause predicate for the second table and a second list of attributes that satisfy a join predicate on the ON clause for the second table.

At 330, the query rewriter produces a modified query having the expanded GROUP BY clause. The modified query is equivalent to the query.

In one case, at 340, the query rewriter enhances a query optimizer to compute a cost for executing the modified query.

In another situation, the query rewriter processes as a preprocessor to the query optimizer.

The approach of the query rewriter reflects the processing of the first technique. Minimal changes to existing query optimizers are used to integrate the approach and the approach improves query efficiency in large database implementations. Additionally, no changes are needed to AMP's of those database implementations.

Figure 4:
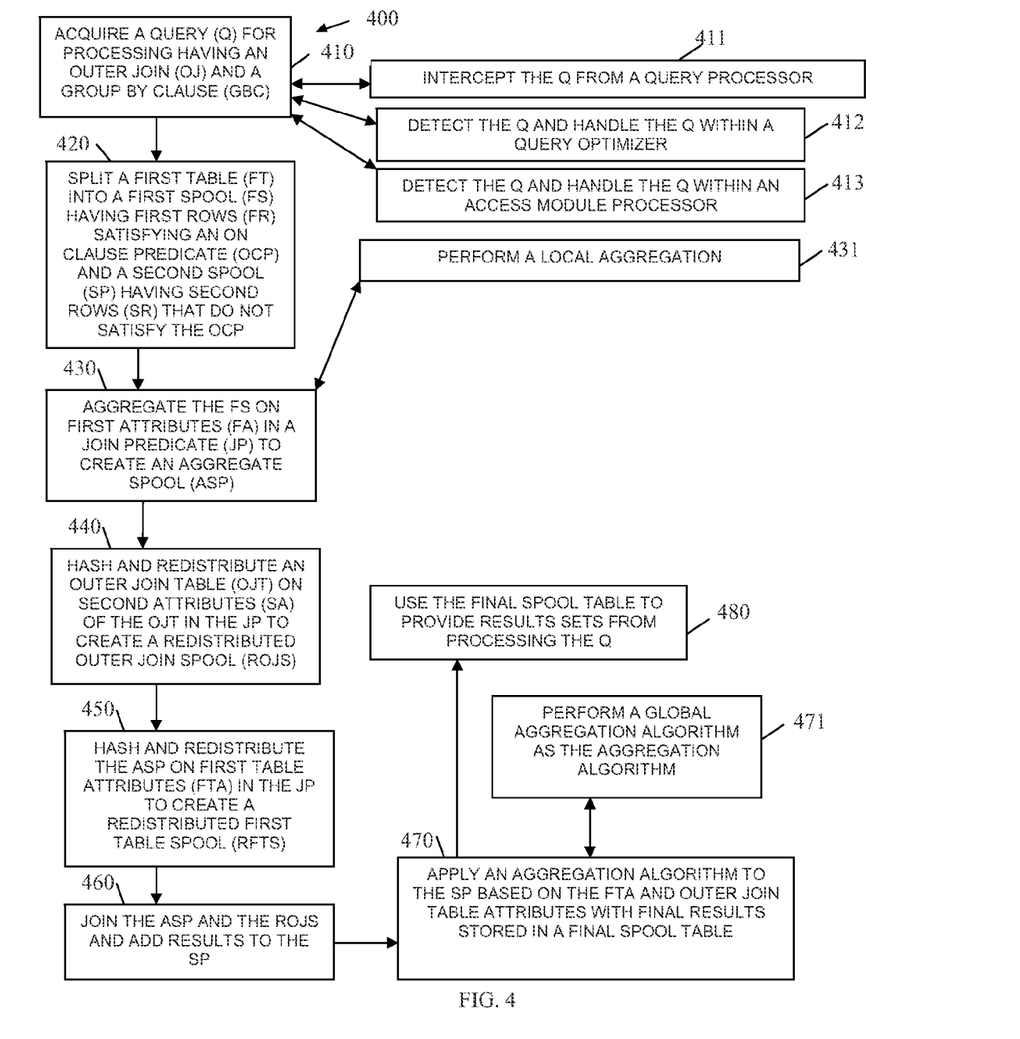
FIG. 4 is a diagram of another method for optimizing an outer join, according to an example embodiment.

FIG. 4 is a diagram of another method 400 for optimizing an outer join, according to an example embodiment. The method 400 (hereinafter "outer join optimizer") is implemented as instructions within a non-transitory computer-readable storage medium that execute on one or more processors, the processors specifically configured to execute the outer join optimizer. Moreover, the outer join optimizer is programmed within a non-transitory computer-readable storage medium. The outer join optimizer may also be operational over a network; the network is wired, wireless, or a combination of wired and wireless.

The outer join optimizer presents another processing perspective to that which was discussed and shown above with respect to the FIG. 1 and associated with the discussion above relevant to the first technique.

At 410, the outer join optimizer acquires a query for processing having an outer join and a GROUP BY clause. This is the case 4 scenario as discussed above. Numerous examples were also presented above with respect to this situation. Acquisition of the query and the manner of processing for the outer join optimizer can occur in a variety of manners.

For example, at 411, the outer join optimizer intercepts the query from a query processor.

In another case, at 412, the outer join optimizer detects the query and handles the query within a query optimizer.

In still another situation, at 413, the outer join optimizer detects and handles the query in whole or in part within an access module processor of a database system.

At 420, the outer join optimizer splits a first table (table associated with the FROM and ON clauses in the query and the outer join) into a first spool having first rows that satisfy an ON clause predicate of the query. Moreover, the first table is split into a second spool having second rows that do not satisfy the ON clause predicate of the query. It is noted that the processing of 420 is done in parallel, such that both spools are created simultaneously.

At 430, the outer join optimizer aggregates the first spool based on first attributes in a join predicate to create an aggregate spool.

In an embodiment, at 431, the outer join optimizer performs a local aggregation (as also shown in the FIG. 1).

At 440, the outer join optimizer hashes and redistributes an outer join table on second attributes of the outer join table in the join predicate to create a redistributed outer join spool.

At 450, the outer join optimizer hashes and redistributes the aggregate spool on first table attributes in the join predicate to create a redistributed first table spool.

At 460, the outer join optimizer performs a join on the aggregate spool and the redistributed first table spool with the results added to the second spool.

Finally, at 470, the outer join optimizer applies an aggregate algorithm to the second spool based on the first table attributes with final results stored in a final spool table.

According to an embodiment, at 471, the outer join optimizer performs a global aggregation algorithm as the aggregation algorithm.

In another situation, at 480, the outer join optimizer uses the final spool table to service and provide results sets from processing the query.

Figure 5:
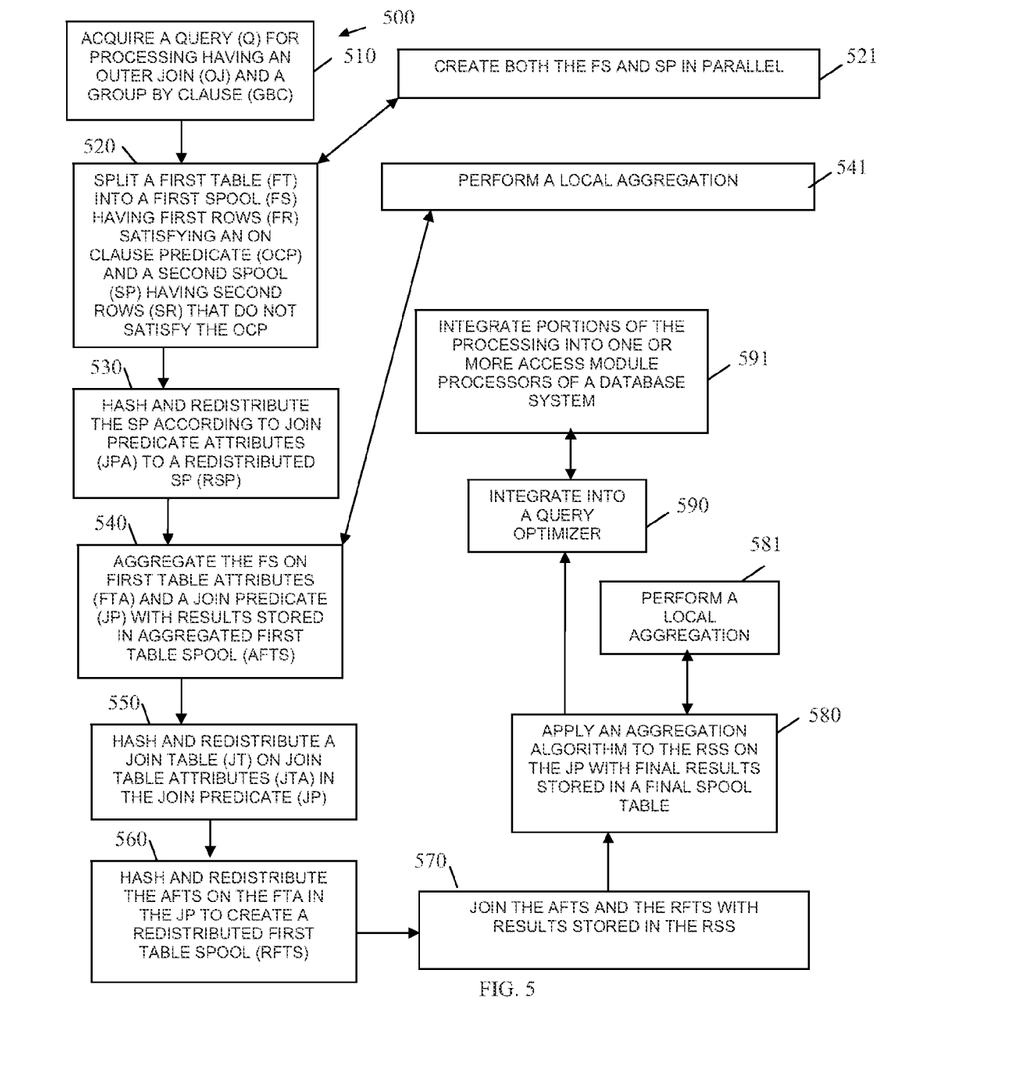
FIG. 5 is a diagram of yet another method for optimizing an outer join, according to an example embodiment.

FIG. 5 is a diagram of yet another method 500 for optimizing an outer join, according to an example embodiment. The method 400 (hereinafter "outer join process handler") is implemented as instructions within a non-transitory computer-readable storage medium that execute on one or more processors, the processors specifically configured to execute the outer join process handler. Moreover, the outer join process handler is programmed within a non-transitory computer-readable storage medium. The outer join process handler may also be operational over a network; the network is wired, wireless, or a combination of wired and wireless.

The outer join process handler presents another processing perspective to that which was discussed and shown above with respect to the FIG. 2 and associated with the discussion above relevant to the second technique.

The outer join process handler is a variation discussed above on the second technique where the grouping list in an original query does not have any attribute from the join table and is the same as the list of attributes of the table in the join predicates.

At 510, the outer join process handler acquires a query for processing an outer join and a GROUP BY clause.

At 520, the outer join process handler splits a first table into a first spool having first rows that satisfies an ON clause predicate. Additionally, the outer join process handler splits the first table into a second spool having second rows that do not satisfy the ON clause predicate.

According to an embodiment, at 521, the outer join process handler creates both the first and second spools in parallel and simultaneously.

At 530, the outer join process handler hashes and redistributes the second spool according to join predicate attributes to a redistributed second spool.

At 540, the outer join process handler aggregates the first spool on first table attributes and a join predicate with results stored in an aggregated first table spool.

According to an embodiment, at 541, the outer join process handler performs a local aggregation.

At 550, the outer join process handler hashes and redistributes a join table on join table attributes in the join predicate.

At 560, the outer join process handler hashes and redistributes the aggregated first table spool on the first table attributes in the join predicate to create a redistributed first table spool.

At 570, the outer join process handler performs a join on the aggregated first table spool and the redistributed first table spool with results stored in a redistributed second spool.

At 580, the outer join process handler applies an aggregation algorithm to the redistributed second spool on the join predicate with final results stored in a final spool table.

According to an embodiment, at 581, the outer join process handler performs a local aggregation.

In an embodiment, at 590, the outer join process handler is integrated into a query optimizer in a database system. Continuing with the embodiment of 590 and at 591, the outer join process handler also has portions of its processing integrated into one or more access module processors of a database system.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented and programmed within a non-transitory computer-readable storage medium and processed by one or more processors, the processors configured to execute the method, comprising:

detecting in a query an outer join on a join table and a second table, the query also including a GROUP BY clause;

expanding the GROUP BY clause to double a total number of groups in a first level partition of the GROUP BY clause for the second table by generating additional query statements in an expanded query that when executed produce a first list of first attributes that satisfy an ON clause predicate for the second table on an ON clause and a second list of attributes that satisfy a join predicate on the ON clause for the second table that does not include any of the first list of attributed that satisfied the ON clause; and producing a modified query having the expanded GROUP BY clause, the modified query is equivalent to the query.

2. The method of claim 1 further comprising, enhancing a query optimizer to compute a cost for executing the modified query.

3. The method of claim 1 further comprising, processing the method as a preprocessor to a query optimizer.

4. The method of claim 1, wherein detecting further includes ensuring the outer join is a left outer join.

5. The method of claim 4, wherein ensuring further includes revising statements associated with the outer join to an equivalent left outer join when the outer join is a right join and when other conditions are present to permit the revision of the statements.

6. The method of claim 1, wherein expanding further includes inserting the additional query statements within a FROM clause that includes the outer join.

7. The method of claim 6, wherein inserting further includes modifying the ON clause and the GROUP BY clause to reflect a new table as the second table referenced in the On clause and the GROUP BY clause, the new table referencing the doubling of the total number of groups in the first level partition.

8. A method implemented and programmed within a non-transitory computer-readable storage medium and processed by one or more processors, the processors configured to execute the method, comprising:

acquiring a query for processing having an outer join and a GROUP BY clause;

splitting a first table into a first spool having first rows satisfying an On clause predicate and a second spool having second rows that do not satisfy the ON clause predicate;

aggregating the first spool on first attributes in a join predicate to create an aggregate spool, wherein the join predicate expands the query to include second attributes not associated with the first attributes;

hashing and redistributing an outer join table on the second attributes of the outer join table in the join predicate to create a redistributed outer join spool;

hashing and redistributing the aggregate spool on first table attributes in the join predicate to create a redistributed first table spool;

joining the aggregate spool and the redistributed outer join spool and adding results to the second spool; and applying an aggregation algorithm to the second spool based on the first table attributes and outer join table attributes with final results stored in a final spool table.

9. The method of claim 8, wherein acquiring further includes intercepting the query from a query processor.

10. The method of claim 8, wherein acquiring further includes detecting the query and handling the query within a query optimizer.

11. The method of claim 8, wherein acquiring further includes detecting the query and handling the query within an access module processor.

12. The method of claim 8, wherein aggregating further includes performing a local aggregation.

13. The method of claim 8, wherein applying further includes perform a global aggregation algorithm as the aggregation algorithm.

14. The method of claim 8 further comprising, using the final spool table to provide results sets from processing the query.

15. A method implemented and programmed within a non-transitory computer-readable storage medium and processed by one or more processors, the processors configured to execute the method, comprising:

acquiring a query for processing having an outer join and a GROUP BY clause;

splitting a first table into a first spool having first rows satisfying an On clause predicate and a second spool having only second rows that do not satisfy the ON clause predicate;

hashing and redistributing the second spool according to join predicate attributes to a redistributed second spool;

aggregating the first spool on first table attributes and a join predicate with results stored in aggregated first table spool;

hashing and redistributing a join table on join table attributes in the join predicate;

hashing and redistributing the aggregated first table spool on the first table attributes in the join predicate to create a redistributed first table spool;

joining the aggregated first table spool and the redistributed first table spool with results stored in a redistributed second spool; and applying an aggregation algorithm to the redistributed second spool on the join predicate with final results stored in a final spool table.

16. The method of claim 15, wherein splitting further includes creating both the first and second spools in parallel.

17. The method of claim 15, wherein aggregating the first spool further includes performing a local aggregation.

18. The method of claim 15, wherein applying further includes performing a local aggregation.

19. The method of claim 15 further comprising, integrating the method into a query optimizer.

20. The method of claim 19 further comprising, integrating portions of the method into one or more access module processors of a database system.

* * * * *